US010584213B2

(12) United States Patent
Wertz et al.

(10) Patent No.: US 10,584,213 B2
(45) Date of Patent: Mar. 10, 2020

(54) PHOSPHAZENE-CONTAINING POLYHEXAHYDROTRIAZINE ELASTOMERS

(71) Applicant: International Business Machines Corporation, Armonk, NY (US)

(72) Inventors: Jason T. Wertz, Pleasant Valley, NY (US); Brandon M. Kobilka, Tucson, AZ (US); Joseph Kuczynski, North Port, FL (US); Jacob T. Porter, Highland, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/100,325

(22) Filed: Aug. 10, 2018

(65) Prior Publication Data

US 2020/0048417 A1    Feb. 13, 2020

(51) Int. Cl.
*C08G 79/025* (2016.01)
*C08G 73/06* (2006.01)
*C08G 85/00* (2006.01)
*C08J 3/24* (2006.01)
*C08L 85/02* (2006.01)

(52) U.S. Cl.
CPC ....... *C08G 79/025* (2013.01); *C08G 73/0644* (2013.01); *C08G 85/004* (2013.01); *C08J 3/24* (2013.01); *C08L 85/02* (2013.01); *C08J 2385/02* (2013.01); *C08L 2203/20* (2013.01)

(58) Field of Classification Search
CPC ............ H01L 51/0067; H01L 51/0072; C09D 161/20; C09D 125/06
USPC .................................................... 528/53, 186
See application file for complete search history.

(56) References Cited

U.S. PATENT DOCUMENTS

| | | | |
|---|---|---|---|
| 6,531,530 B2 | 3/2003 | Asano | |
| 6,876,125 B2 | 4/2005 | Basheer et al. | |
| 8,420,738 B2 | 4/2013 | Nakano et al. | |
| 8,629,206 B2 | 1/2014 | Konig et al. | |
| 2006/0293432 A1 | 12/2006 | Hirano et al. | |

(Continued)

FOREIGN PATENT DOCUMENTS

TW        201704248 A        2/2017

OTHER PUBLICATIONS

Allcock et al., "Synthesis of New Polyphosphazene Elastomers," Macromolecules, Aug. 20, 1990, vol. 23, No. 17, pp. 3873-3877.
(Continued)

*Primary Examiner* — Shane Fang
(74) *Attorney, Agent, or Firm* — Kelsey M. Skodje

(57) ABSTRACT

An elastomer, a process for forming an elastomer, and an article of manufacture are disclosed. The elastomer comprises a phosphazene backbone and at least one polyhexahydrotriazine component. The process for forming the elastomer includes obtaining an amine-terminated cyclotriphosphazene, reacting it with a diamine to form a phosphazene-containing PHT polymer, and then reacting the phosphazene-containing PHT polymer with a side-chain modified cyclic phosphazene to form a PCPHT elastomer with halogen ligands. The PCPHT elastomer with halogen ligands is then reacted with an alkoxide to form a PCPHT elastomer with at least one ether-linked side chain. The article of manufacture comprises a material comprising an elastomer having a phosphazene backbone and at least one PHT component.

20 Claims, 7 Drawing Sheets

(56) References Cited

U.S. PATENT DOCUMENTS

2014/0192501 A1    7/2014    Kotake et al.
2016/0222192 A1    8/2016    Takashima et al.

OTHER PUBLICATIONS

Allcock, H., "Plyphosphazene elastomers, gels, and other soft materials," Soft Matter, 2012, 8, pp. 7521-7532. DOI: 10.1039/c2sm26011e.

Allcock, H., "Polyphosphazene Applications," Updated Oct. 15, 2017, pp. 1-6. http://www.personal.psu.edu/hra1/applications1.htm.

Krishnadevi et al., "Development of halogen-free flame retardant phosphazene and rice husk ash incorporated benzoxazine blended epoxy composites for microelectronic applications," New Journal of Chemistry, 2015, 39, pp. 6555-6567. DOI: 10.1039/c5nj00364d.

Modzelewski et al., "Elastomeric Polyphosphazenes with Phenoxy—Cyclotriphosphazene Side Groups," Macromolecules, 2015, 48, pp. 7543-7549, ACS Publications. DOI: 10.1021/acs.macrmol.5b01892.

Modzelewski et al., "Polyphosphazene Elastomers Containing Interdigitated Oligo-p-phenyleneoxy Side Groups: Synthesis, Mechanical Properties, and X-ray Scattering Studies," Macromolecules, 2015, 48, pp. 4882-4890, ACS Publication. DOI: 10.1021/acs.macromol.5b01191.

Rothemund et al., "Preparation of polyphosphazenes: a tutorial review," Tutorial Review, Chemical Society Reviews, 2016, 45, pp. 5200-5215. DOI: 10.1039/c6cs00340k.

Singler et al., "Chapter 9: Phosphazene Elastomers: Synthesis, Properties, and Applications," from "Polymers for Fibers and Elastomers," Eitor(s): Arthur et al., ACS Symposium Series, Aug. 1984, pp. 143-157.

"Elastomer Engineering Guide," James Walker, James Walker Sealing Products and Services Ltd, 2012, pp. 1-48.

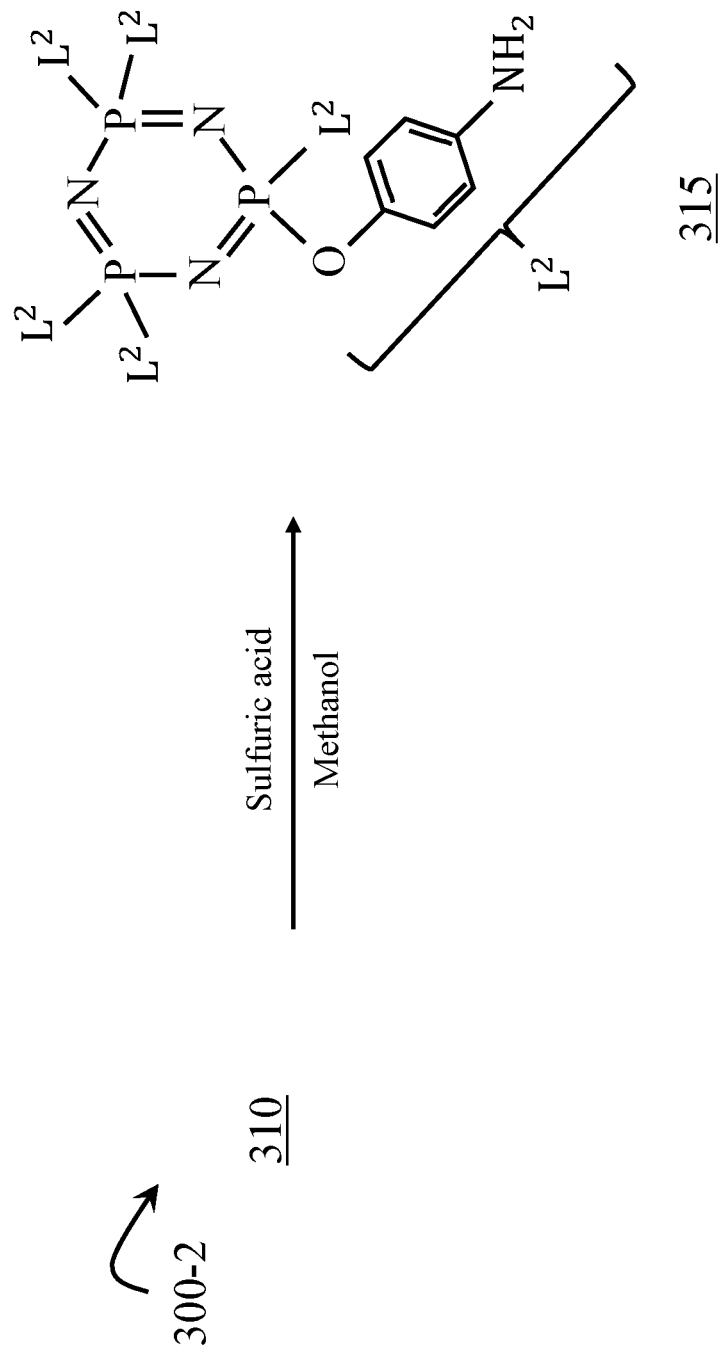

PHOSPHAZENE-CONTAINING POLYHEXAHYDROTRIAZINE ELASTOMERS

BACKGROUND

The present disclosure relates to elastomers and more specifically to recyclable phosphazene-containing polyhexahydrotriazine elastomers.

Polyhexahydrotriazine (PHT) polymers are thermoset polymers that have a variety of applications. They are resistant to deformation, heat, solvents, and other environmental stressors. Polyphosphazene elastomers have been found to be flame retardant and are thermoplastic elastomers. They are inherently flexible due to the flexibility of their polyphosphazene cores.

SUMMARY

Various embodiments are directed to an elastomer comprising a phosphazene backbone combined with at least one polyhexahydrotriazine (PHT) component. The elastomer can be formed in a process that includes an amine-terminated cyclic phosphazene. The phosphazene backbone has a PHT component bound to it, and can contain halogen ligands and at least one ether-linked side chain. The ether-linked side chains can be selected from a group consisting of an alkoxy group, an ethoxy group, a trifluoromethoxy group, and a methoxy group. The phosphazene backbone can also contain at least one side-chain selected from a group consisting of a methyl group, ethyl group, n-propyl group, n-butyl group, a phenyl group, a carboranyl group, and an organosilicon unit.

Additional embodiments are directed to a process of forming an elastomer. The process includes providing an amine-terminated cyclic phosphazene and reacting it with a diamine to form a phosphazene-containing PHT polymer. The phosphazene-containing PHT polymer can be reacted with a side-chain modified cyclic phosphazene to form a PCPHT elastomer having halogen ligands. The process can also include reacting the PCPHT elastomer having halogen ligands with an alkoxide to form a PCPHT elastomer having at least one ether-linked side chain. Providing the amine-terminated cyclic phosphazene can include synthesizing the amine-terminated cyclic phosphazene in a reaction between a cyclotriphosphazene and an aromatic alcohol having an acetamide group. The alcohol can be selected from a group consisting of 4-acetamido phenol, 4-acetamidobenzyl alcohol, and 4'-(2-hydroxyethyl) acetanilide. The side-chain modified cyclic phosphazene can have at least one side-chain selected from a group consisting of a methyl group, an ethyl group, an n-propyl group, n-butyl group, a phenyl group, a carboranyl group, and an organosilicon unit. The diamine can be an aromatic diamine, such as 4,4'-oxydianiline. The PCPHT elastomer can be cured through a reaction with a peroxide or vulcanization.

Further embodiments are directed to an article of manufacture comprising an elastomer containing a phosphazene backbone and a PHT component. The article of manufacture can also include at least one electrical component, such as a printed circuit board, a semiconductor, a transistor, an optoelectronic component, a capacitor, a resistor, and a chip carrier. Further, the material can be an adhesive or a synthetic rubber. The elastomer can also include at least one ether-linked side-chain.

BRIEF DESCRIPTION OF THE DRAWINGS

FIG. 3B is a chemical reaction diagram illustrating a process of synthesizing an amine-terminated cyclotriphosphazene, according to some embodiments of the present disclosure.

DETAILED DESCRIPTION OF THE DRAWINGS

Figure 1:
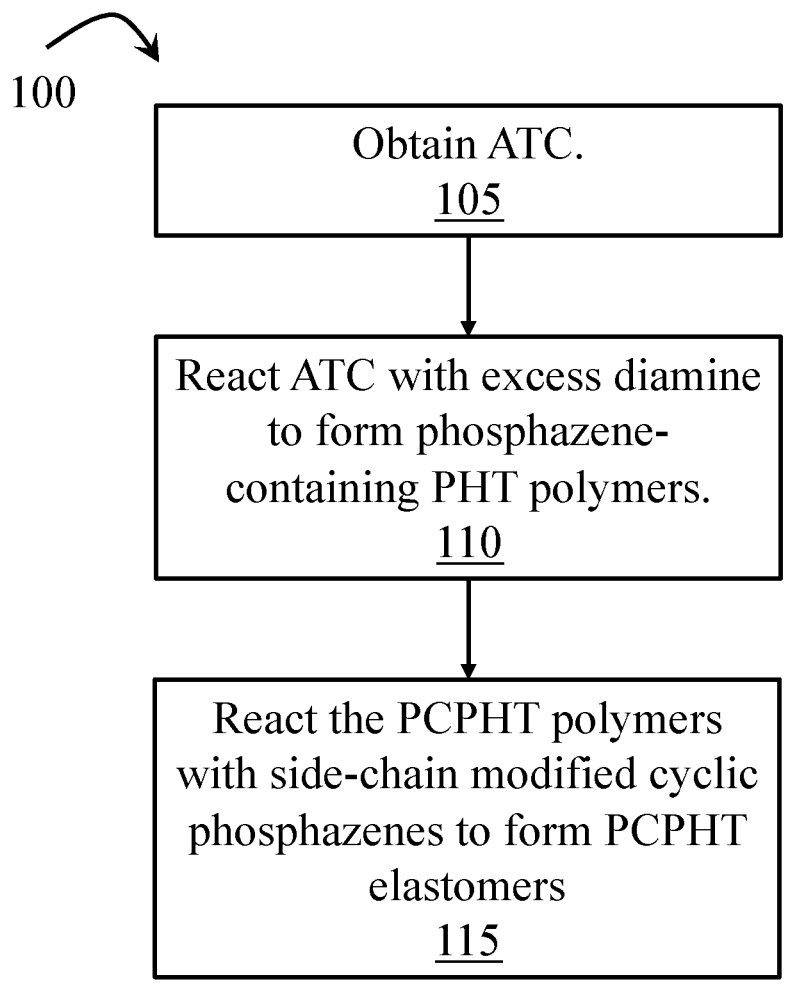
FIG. 1 is a flow diagram illustrating a process of synthesizing phosphazene-containing polyhexahydrotriazine (PCPHT) elastomers.

Polyhexahydrotriazine (PHT) polymers are versatile thermoset polymers. They have many applications, as they are lightweight, durable, and recyclable. For example, PHT polymers can be used as components of automotive and other devices, such as body parts and electronic components (e.g., enclosures, insulation, semiconductors, etc.). PHT polymers have properties that include high elastic moduli, the ability to self-heal, recyclability, and resistance to solvents and high temperatures. PHT polymers are also resistant to environmental cracking stress. For example, PHT polymers can have a Young's modulus of about 8-14 GPa. For comparison, bone typically has a Young's modulus of approximately 9 GPa. Each PHT polymer contains at least one

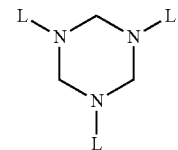

hexahydrotriazine group having the structure wherein L represents additional components of the polymer. These components are discussed in greater detail below.

Flame retardant additives and/or impact resistant additives are often blended with PHT polymers, causing the polymers to require additional processing. The additives are frequently in the form of small molecules or particles and require loading levels of up to 30%. However, the presence of additives in the PHT polymer can change properties of the polymer in undesirable ways. For example, flame retardant additives can compromise the mechanical properties of the PHT polymer, and impact resistant additives can cause the flame retardancy of the PHT polymer to be reduced. Additionally, when materials containing PHT polymers and additives are disposed of (e.g., in a landfill), the additives can leach into the surrounding environment and cause harm to exposed organisms. Further, the additional processing of the polymers that is required in order to blend the additive can be costly and time consuming.

Unlike materials (e.g., plastics) made from PHT polymers, materials made from most conventional thermoset polymers are not recyclable. Combined with the high solvent and environmental resistance of thermoset polymers, this makes for a large environmental impact from the usage of these products. Conventional thermoset plastics can take hundreds, in some cases thousands, of years to break down, and cause great environmental damage. This category of conventional plastics can take even longer to decompose than the typical plastic water bottle because of thermoset polymers' high resistance to a multitude of decomposing agents (e.g., solvents, heat, environment, etc.). Further, thermoset polymers' lack of flexibility limits their applications.

In contrast, thermoplastic polymers, such as elastomers, form weaker cross-linkages than thermosets. The weaker cross-linkages in elastomers cause them to be flexible. Further, weaker cross-linkages allow thermoplastic elastomers to be molded, extruded, and reused/recycled. However, thermoplastic elastomers, while recyclable, cannot take the place of thermosets in most applications because of their tendency to melt at high temperatures and experience creep deformation.

According to some embodiments of the present disclosure, phosphazene-containing polyhexahydrotriazine (PCPHT) elastomers are formed. The PCPHT elastomers have qualities of a traditional thermoset polymer, including the recyclability of PHT polymers, but cross into the thermoplastic elastomer space due to their flexibility and ability to be molded and extruded. In addition to their appealing thermoplastic qualities, the PCPHT elastomers are resistant to solvents, environmental stressors, and heat, as well as chemically stable with self-healing capabilities. They can also withstand use in a wider temperature range (e.g. approximately 75° C.-205° C. for maximum continuous heat resistance and approximately 105° C.-325° C. for maximum intermittent heat resistance) than that of thermoplastic elastomers.

The PCPHT elastomers disclosed herein provide flexibility, strength, recyclability, durability, and flame retardancy without the need for additives. These properties can be tuned by adjusting the type and relative amounts of different monomers and substituents, as well as by blending the PCPHT elastomers with other petroleum-based or renewable polymers. Examples of materials that can be blended with the compounds described herein can include polyhemiaminal, carbon fillers, epoxy resins, polyhydroxyurethanes, polycarbonates, polyesters, polyacrylates, polyimides, polyamides, polyureas, poly(vinyl-ester)s, etc.

FIG. 1 is a flow diagram illustrating a process 100 of forming a PCPHT elastomer. Process 100 begins with the obtainment of an amine-terminated cyclic phosphazene. This is illustrated at step 105. In some embodiments, the amine-terminated cyclic phosphazene is synthesized, though it can also be acquired from another source (e.g., a commercial source or a research institution). The synthesis of the amine-terminated cyclic phosphazene includes a reaction between a cyclic phosphazene and an aromatic alcohol having an acetamide functional group (e.g., 4-acetamido phenol, 4-(hydroxyphenyl) acetamide, N-[(2-hydroxyphenyl)-(3-nitrophenyl)-methyl]-acetamide, etc.). The synthesis of amine-terminated cyclic phosphazenes is discussed in greater detail with respect to FIGS. 3A and 3B.

Process 100 continues with the synthesis of polyhexahydrotriazine (PHT) polymers. This is illustrated at step 110. These PHT polymers are synthesized in a reaction between the amine-terminated cyclic phosphazene (ATCP) and an aromatic diamine (e.g., 4-4'-oxydianiline, dimethylcyclohexan-1,2-diamine, [1,1'-binaphthalene]-2,2'-diamine, etc.). The aromatic amine can also be monocyclic or polycyclic, and may have bridging groups and/or additional functional groups such as aromatic, aliphatic, acyl, vinyl, and inorganic groups (e.g., halides, hydroxyls, phosphates, sulfates, etc.). In some embodiments, a mixture of two or more different aromatic diamines can be used. The synthesis of PHT polymers is discussed in greater detail with respect to FIG. 4.

Process 100 continues with the synthesis of PCPHT elastomers. This is illustrated at step 115. The PCPHT elastomers are synthesized in a reaction between a side-chain modified cyclic phosphazene and the phosphazene-containing PHT polymers. Additional side-chain modifications can be also made to a PCPHT elastomer after its formation. In some embodiments, the PCPHT elastomers have a number average molecular weight ($M_n$) of approximately 1,000 to 20,000. However, the $M_n$ of the PCPHT elastomers can also be in a range of approximately 1,000 to 50,000 or approximately 1,000 to 100,000. The synthesis of PCPHT elastomers is discussed in greater detail with respect to FIGS. 5A and 5B. A variety of side-chain modified cyclic phosphazenes can be used and are discussed in greater detail with respect to FIG. 2.

The PCPHT elastomers include a polyphosphazene backbone and at least one PHT component bound to the polyphosphazene backbone. The hexahydrotriazine groups in the PHT component contribute the strength and recyclability characteristic of traditional PHT polymers. Further, the PCPHT elastomers, like traditional PHT polymers, are acid-resistant above approximately pH 3. They break down into monomers in acidic solutions below approximately pH 3. The polyphosphazene backbone contributes elastomeric properties. Polyphosphazene elastomers are a well-known class of elastomeric polymers. They include elastomers such as poly(dichlorophosphazene) and organophosphazene. The polyphosphazene backbone also imparts flame retardant properties to the PCPHT elastomers. This flame retardancy is caused by both vapor phase flame quenching and char formation.

Conventional thermoset elastomers such as synthetic rubbers (e.g., acrylonitrile butadiene rubber, polyacrylate rubber, polyurethane rubber, etc.) and natural rubber (isoprene rubber), when cured through vulcanization, form irreversible cross-linkages, which is where much of their high resistance to decomposing factors such as heat and solvents comes from. However, the PCPHT elastomers formed in process 100 retain high environmental resistance, while containing cross-linkages that are reversible after vulcanization or other curing processes. These properties allow the PCPHT elastomers to be used in high-stress applications while retaining their flexibility. Further, their ability to be broken down into monomers by strong acids (e.g., perchloric acid, hydrobromic acid, hydroiodic acid, hydrochloric acid, nitric acid, sulfuric acid, etc.) allows the PCPHT elastomers to be recycled.

Figure 2:
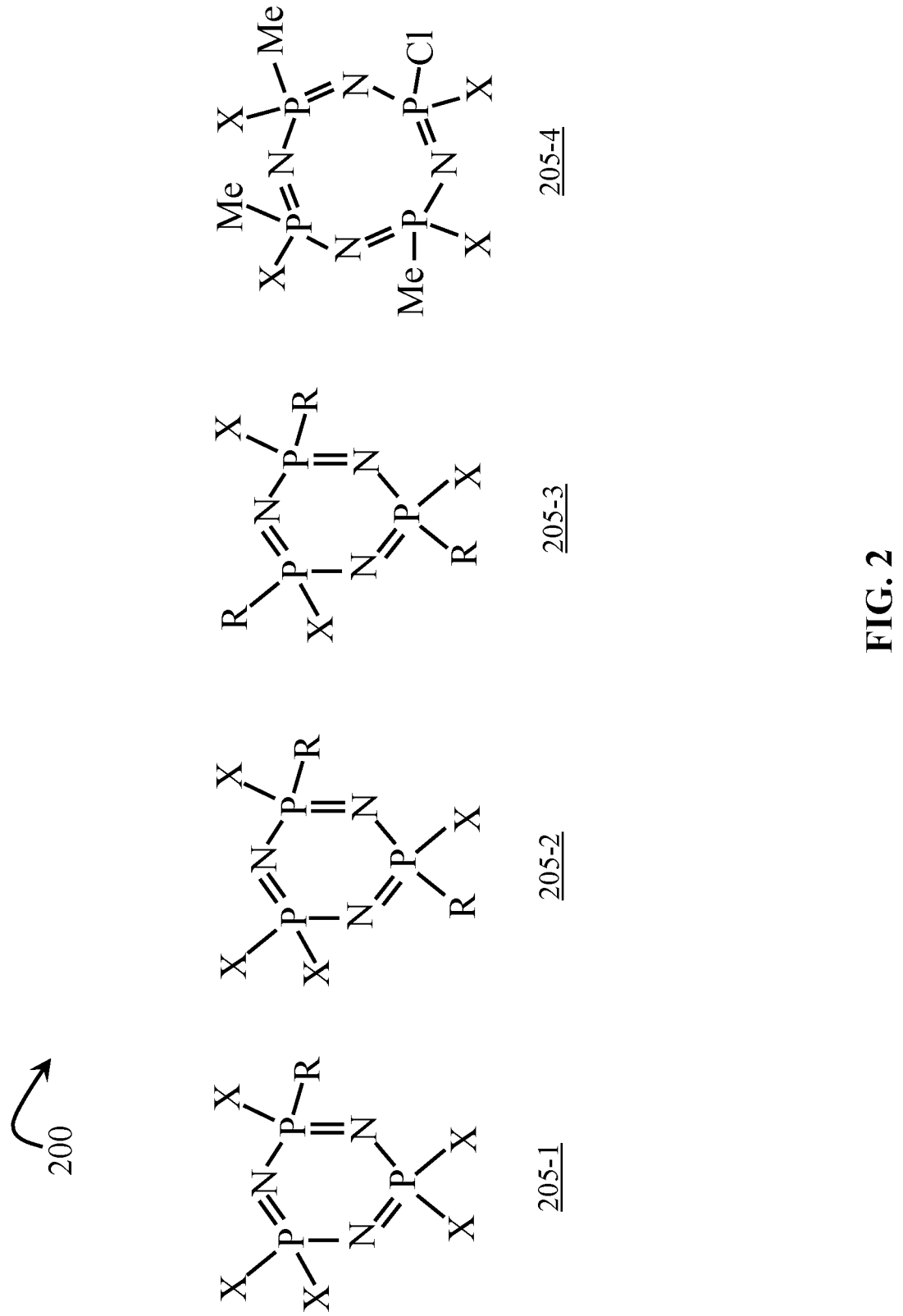
FIG. 2 is a chemical structure diagram illustrating examples of side-chain modified cyclic phosphazene compounds, according to some embodiments of the disclosure.

FIG. 2 is a chemical structure diagram 200 illustrating examples of side-chain modified cyclic phosphazenes 205-1, 205-2, 205-3, and 205-4 (collectively 205), according to some embodiments of the present disclosure. These cyclic phosphazenes 205 can be used in reactions to form PCPHT elastomers. While each cyclic phosphazene 205 listed may be used to form PCPHT elastomers, the properties of the resulting PCPHT elastomer may be affected by the structure of the starting material. The cyclic phosphazenes have chlorine (Cl) or fluorine (F) ligands, represented by X in the figure. They also have at least one R group side chain. Examples of these R groups can include methyl, ethyl, n-propyl, n-butyl, phenyl, carboranyl, or organosilicon units. Additional examples of R groups can be aryl (e.g., naphthyl, thienyl, indolyl, tolyl, and xylyl) or alkyl (e.g., cyclic or $C_1$-$C_2$ acyclic alkyl groups). Using different cyclic phosphazenes 205 can affect the elastomeric properties, as would be understood by a person of ordinary skill in the art. However, changing the cyclic phosphazene does not substantially alter the qualities of environmental resistance, recyclability, and cross-linkage reversibility.

Figure 3A:
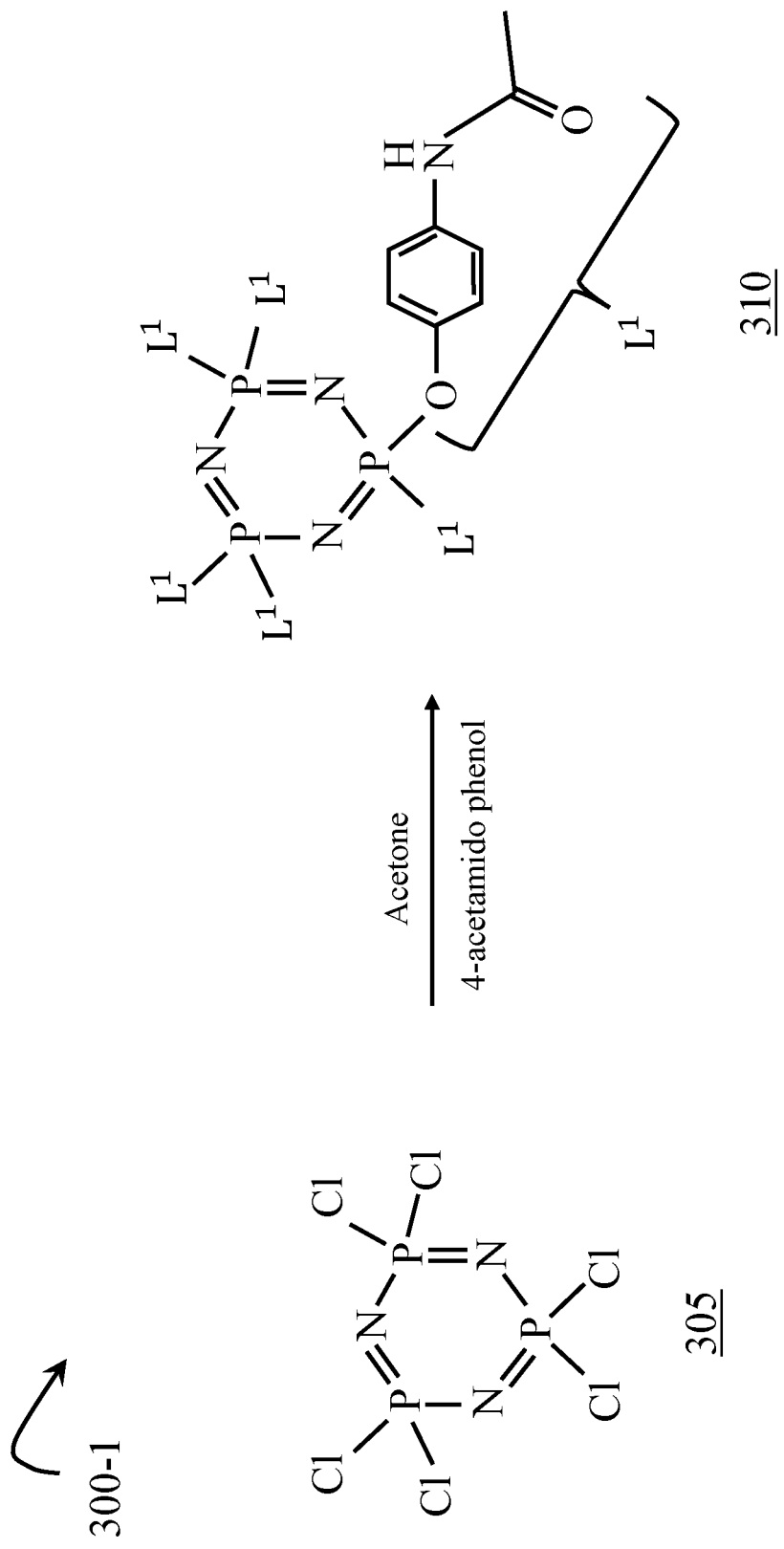
FIG. 3A is a chemical reaction diagram illustrating a process of synthesizing an amine-terminated cyclotriphosphazene, according to some embodiments of the present disclosure.

FIG. 3A is a chemical reaction diagram illustrating a process 300-1 of synthesizing a precursor to the PCPHT elastomers, according to some embodiments of the present disclosure. Process 300-1 begins with a chemical reaction between cyclotriphosphazene 305, acetone, and 4-acetamido phenol. This reaction forms the precursor, hexa(acetamidophenyl)cyclotriphosphazene (HAC) 310. The reaction includes combining 4-acetamido phenol and potassium carbonate in dry acetone. This mixture is agitated at room temperature for approximately 30 minutes. The cyclotriphosphazene 305 is added to the mixture and refluxed at approximately 60° C. for about 4 days. The product is cooled, and the HAC 310 is filtered out and purified with hexane. The HAC 310 is then dried in a vacuum oven at approximately 50° C. for around 2 hours. While 4-acetamido phenol is used in process 300-1, other aromatic alcohols with acetamide groups (e.g., 4-acetamidobenzyl alcohol and/or 4'-(2-hydroxyethyl) acetanilide) are used in some embodiments. Further, a cyclotriphosphazene 305 with fluorine (F) ligands instead of chlorine (Cl) can be used instead to produce the HAC 310.

FIG. 3B is a chemical reaction diagram illustrating a process 300-2 of synthesizing an amine-terminated cyclotriphosphazene, according to some embodiments of the present disclosure. In process 300-2, the precursor HAC 310 is combined with sulfuric acid ($H_2SO_4$) in a methanol solution. This mixture is refluxed for about 4 hours at approximately 80° C. The mixture is then cooled to room temperature. A flask containing the mixture is placed in an ice bath, and while in the ice bath, ammonia is added dropwise to the mixture. Ammonia is added until the pH of the reaction mixture reaches approximately 8. The solid product, amine-terminated cyclotriphosphazene 315, is filtered, washed with water, and then dried in a vacuum oven for around 48 hours at approximately 60° C.

Figure 4:
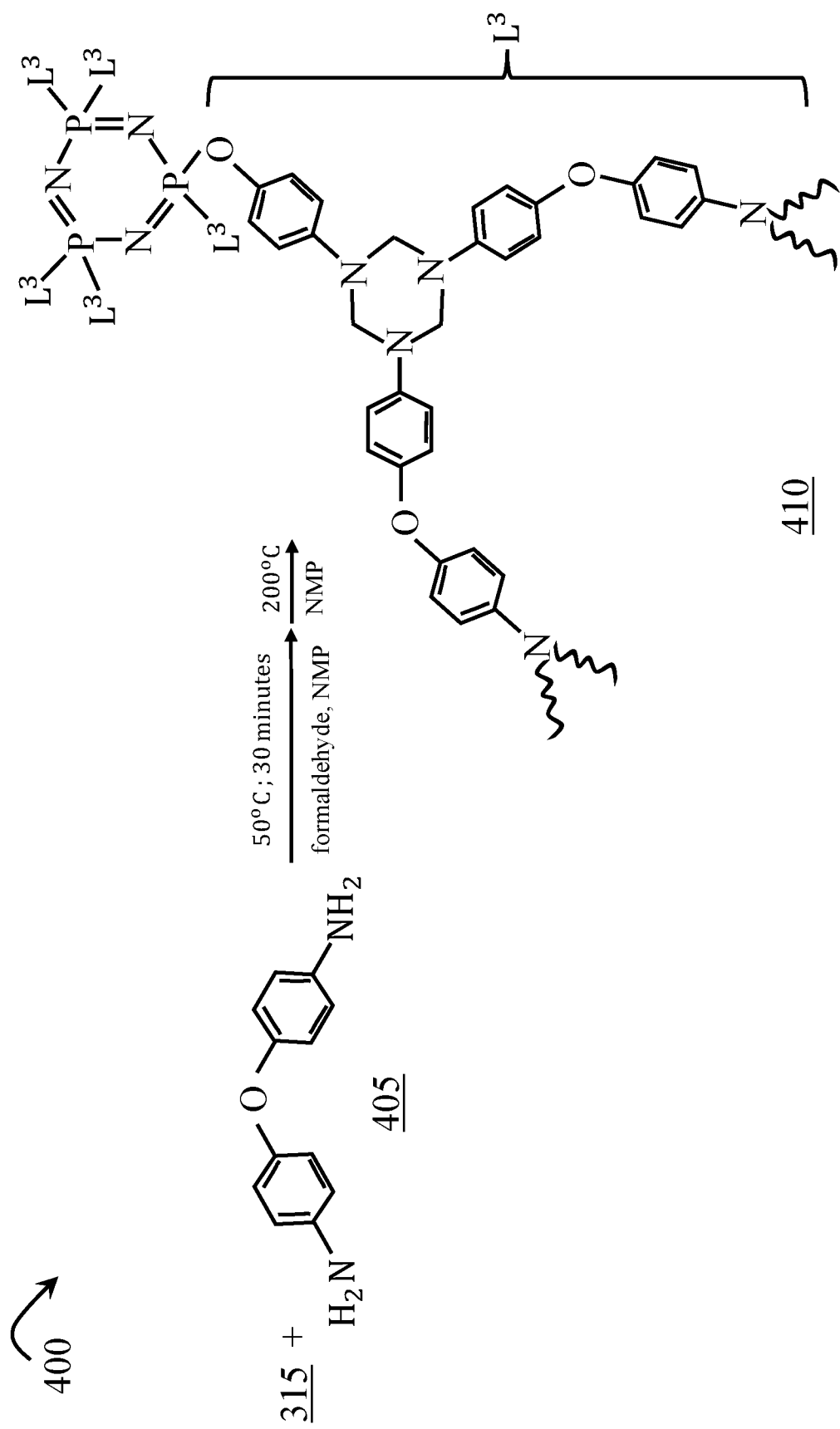
FIG. 4 is a chemical reaction diagram illustrating a process of synthesizing phosphazene-containing PHT polymers, according to some embodiments of the present disclosure.

FIG. 4 is a chemical reaction diagram illustrating a process 400 of synthesizing a PHT polymer, according to some embodiments of the present disclosure. In process 400, a combination of the amine-terminate cyclotriphosphazene 315 and an aromatic diamine (4,4'-oxydianiline) 405 are reacted with approximately 2.5 equivalents of formaldehyde in N-methyl-2-pyrrolidone (NMP). However, in some embodiments, formaldehyde is replaced by paraformaldehyde. Further, the 4,4'-oxydianiline 405 can be replaced with another aromatic diamine. This is discussed in greater detail with respect to FIG. 1. The reaction is carried out at approximately 50° C. for approximately thirty minutes. The temperature is then increased to approximately 200° C., and the mixture is allowed to react for about one hour at that temperature. This results in the formation of the phosphazene-containing PHT polymer 410. In the illustrated phosphazene-containing PHT polymer 410, the PHT components bound to the cyclic phosphazene are represented by $L^3$. Additionally, nitrogen (N) atoms having two wavy bonds represent portions of additional hexahydrotriazine groups that are part of the $L^3$ PHT components.

Figure 5A:
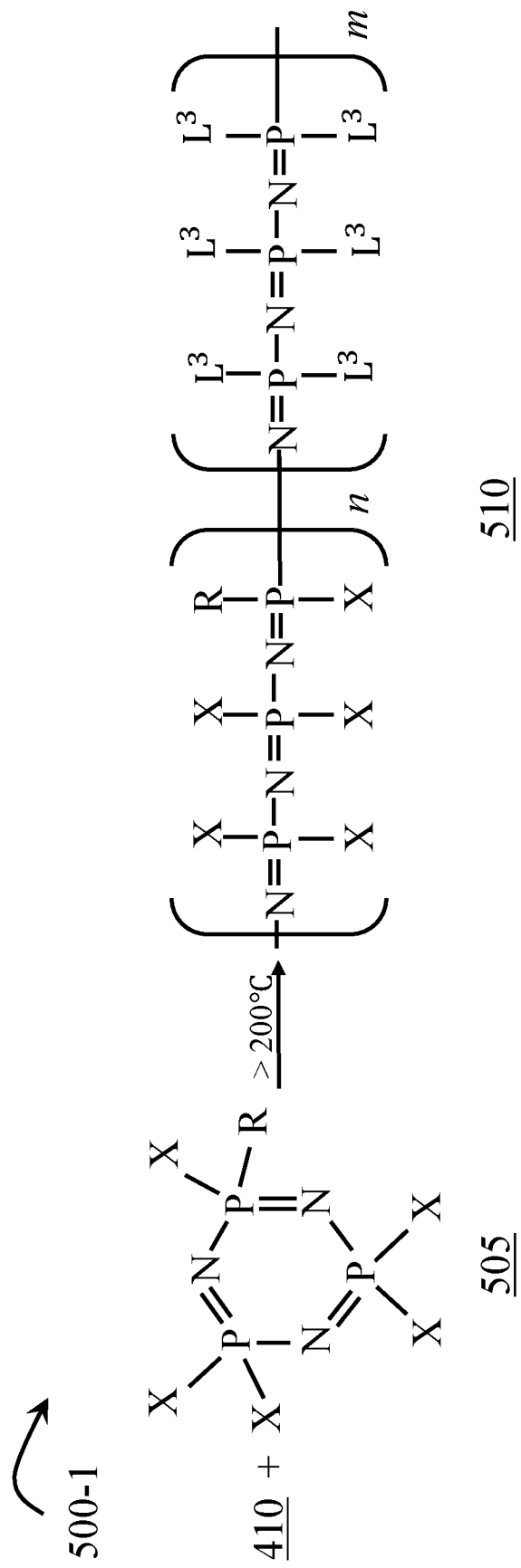
FIG. 5A is a chemical reaction diagram illustrating a process of synthesizing PCPHT elastomers, according to some embodiments of the present disclosure.

FIG. 5A is a chemical reaction diagram illustrating a process 500-1 of synthesizing a PCPHT elastomer, according to some embodiments of the present disclosure. Process 500-1 includes combining the phosphazene-containing PHT polymer 410 and a side-chain modified cyclic phosphazene 205-1. This mixture is then allowed to react at a temperature approximately between 200° C. and 210° C. to complete the synthesis of the PCPHT elastomer 510. If placed at a temperature significantly higher than the range listed (e.g., approximately 225° C. or above), there is a risk of the material beginning to degrade. Additional examples of side-chain modified cyclic phosphazenes 205 that can be used in process 500-1 are discussed in greater detail with respect to FIG. 2. The PCPHT elastomer 510 has a polyphosphazene backbone with at least one portion (n block) having halogen (X) ligands and at least one R side chain. The polyphosphazene backbone also includes at least one portion (m block) bound to the PHT components ($L^3$).

Figure 5B:
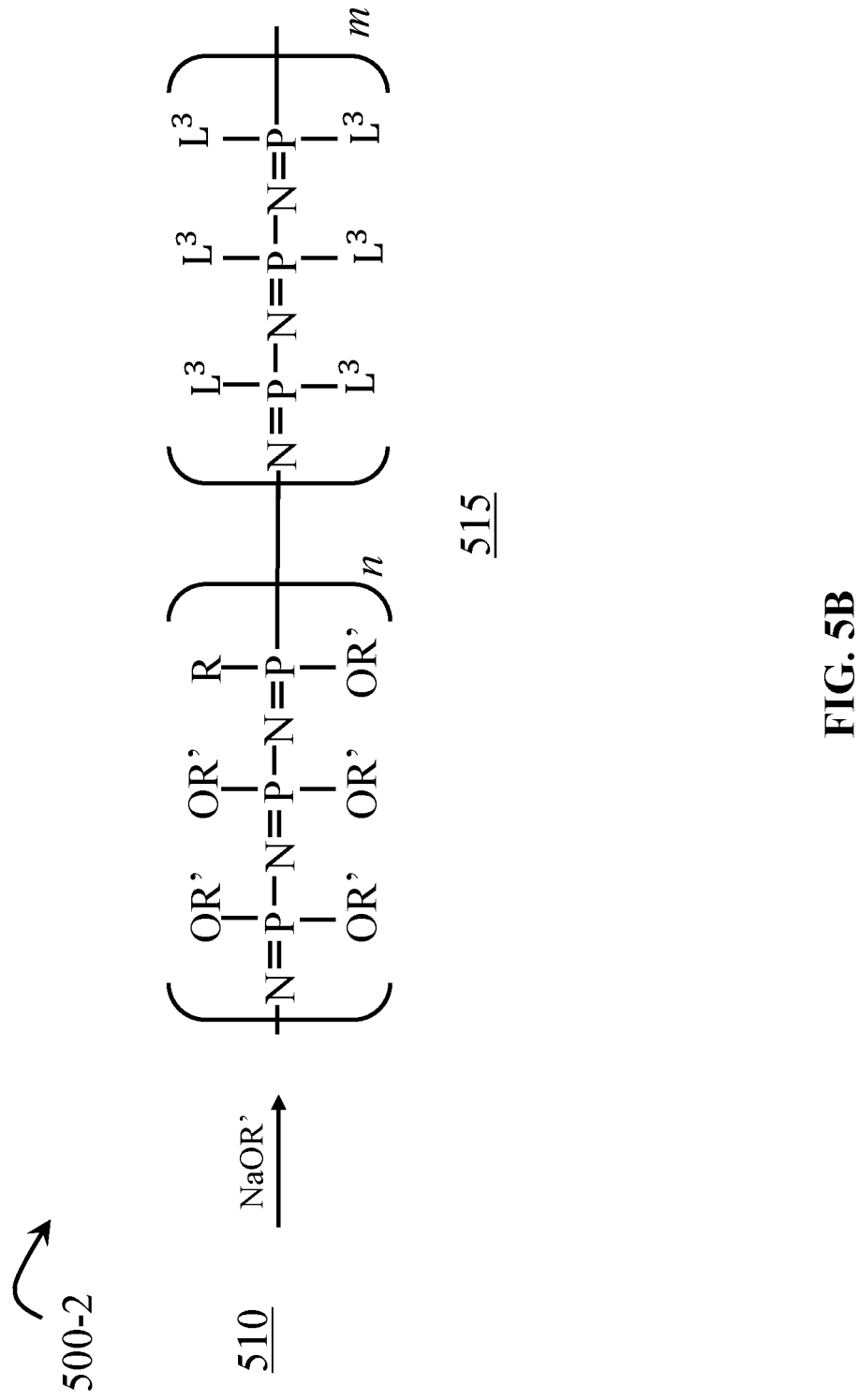
FIG. 5B is a chemical reaction diagram illustrating a process of synthesizing PCPHT elastomers having ether-linked side chains, according to some embodiments of the present disclosure.

FIG. 5B is a chemical reaction diagram illustrating a process 500-2 of synthesizing a modified PCPHT elastomer, according to some embodiments of the present disclosure. In process 500-2, alkoxy (OR') side chains are attached to the polyphosphazene backbone of the PCPHT elastomer 510 formed in process 500-1. These alkoxy side chains replace the n block halogen (X) ligands. The source of the alkoxy substituents is an alkoxide compound having the generic formula NaOR'. In some embodiments, the alkoxide is sodium 2,2,2-trifluoroethanolate ($NaOCH_2CF_3$). This compound is combined with the PCPHT elastomer 510, resulting in a modified PCPHT elastomer 515 having trifluoroethoxy substituents (OR'=$OCH_2CF_3$). However, $NaOCH_2CF_3$ can be replaced by another NaOR' compound having different alkoxy groups. Examples of alternative alkoxy substituents that can be bound to the modified PCPHT elastomer 515 when appropriate alkoxide compounds are used can include ethoxy groups, trifluoromethoxy groups, methoxy groups, etc. Further, OR' groups having at least one unsaturated (e.g., vinyl) moiety can be included in some embodiments.

The resulting PCPHT elastomer 515 having ether-linked side chains is a thermoset elastomer, meaning that it can undergo a vulcanization or alternative curing process. The compound is set by crosslinking the polymers chains in the compound as a result of a high temperature and pressure. In some embodiments, the PCPHT elastomer 515 is combined with at least one accelerator, of which there are two types: primary and secondary accelerators. Secondary accelerators can be used to activate the primary accelerator, which in turn accelerates the overall vulcanization process. Oftentimes, sulfur-based vulcanization systems contain both types of accelerators. Examples of primary accelerators can include dithiocarbamates and thiazoles, and examples of secondary accelerators can include zinc oxide and stearic acid. Examples of curing processes other than vulcanization that may be used include reactions with peroxides, such as tert-butyl perbenzoate, dicumyl peroxide, benzoyl peroxide, and di-tert-butyl peroxide.

Examples of applications for materials made, at least in part, from PCPHT elastomers 515 can include electronics hardware, seals, O-rings, and shock-absorbing devices. The PCPHT elastomers 515 can also be used in applications such as tubing, wires and cables, flooring, insulation, adhesives, paints, coatings, synthetic rubbers, and many others (e.g., automotive and aerospace materials). The aforementioned materials that include PCPHT elastomers 515 can be incorporated into devices with electronic components (e.g., printed circuit boards (PCBs), semiconductors, transistors, optoelectronics, capacitors, resistors, chip carriers, etc.). Further, PCPHT elastomers 515 can be recycled using a strong acid.

It should be noted that, in some embodiments, the compounds described herein can contain one or more chiral centers. These can include racemic mixtures, diastereomers, enantiomers, and mixtures containing one or more stereoisomer. Further, the disclosed compounds can encompass racemic forms of the compounds in addition to individual stereoisomers, as well as mixtures containing any of these. Temperature and time ranges indicated herein can include the temperature or time on either end of the range, or any temperature or time between these limits.

The synthetic processes discussed herein, and their accompanying drawings are not to be construed as limiting. One skilled in the art would recognize that a variety of synthetic reactions may be used that vary in reaction conditions, components, methods, etc., which ultimately generate PCPHT elastomers. In addition, the reaction conditions can optionally be changed over the course of a process. Further, in some embodiments, processes can be added or omitted while still remaining within the scope of the disclosure, as will be understood by a person of ordinary skill in the art.

What is claimed is:

1. An elastomer, comprising:
a polyphosphazene backbone; and
at least one polyhexahydrotriazine component.

2. The elastomer of claim 1, wherein the polyphosphazene backbone includes at least one portion having ether-linked side chains.

3. The elastomer of claim 2, wherein the ether-linked side chains are selected from a group consisting of an alkoxy group, an ethoxy group, a trifluoromethoxy group, and a methoxy group.

4. The elastomer of claim 1, wherein the elastomer is formed in a process that includes an amine-terminated cyclic phosphazene.

5. The elastomer of claim 1, wherein the at least one polyhexahydrotriazine component is bound to the polyphosphazene backbone.

6. The elastomer of claim 1, wherein the polyphosphazene backbone contains at least one side-chain selected from a group consisting of a methyl group, an ethyl group, an n-propyl group, an n-butyl group, a phenyl group, a carboranyl group, and an organosilicon unit.

7. A process of forming an elastomer, comprising:
providing an amine-terminated cyclic phosphazene;
reacting the amine-terminated cyclic phosphazene with a diamine to form a phosphazene-containing polyhexahydrotriazine polymer;
reacting the phosphazene-containing polyhexahydrotriazine polymer with a side-chain modified cyclic phosphazene to form a phosphazene-containing polyhexahydrotriazine elastomer having halogen ligands; and
reacting the phosphazene-containing polyhexahydrotriazine elastomer having halogen ligands with an alkoxide to form a phosphazene-containing polyhexahydrotriazine elastomer having at least one ether-linked side chain.

8. The process of claim 7, wherein providing the amine-terminated cyclic phosphazene includes synthesizing the amine-terminated cyclic phosphazene in a reaction between a cyclotriphosphazene and an aromatic alcohol having an acetamide group.

9. The process of claim 8, wherein the aromatic alcohol having the acetamide group is selected from a group consisting of 4-acetamido phenol, 4-acetamidobenzyl alcohol and 4'-(2-hydroxyethyl) acetanilide.

10. The process of claim 7, wherein the side-chain modified cyclic phosphazene has at least one side-chain selected from a group consisting of a methyl group, an ethyl group, an n-propyl group, an n-butyl group, a phenyl group, a carboranyl group, and an organosilicon unit.

11. The process of claim 7, wherein the diamine is an aromatic diamine.

12. The process of claim 11, wherein the aromatic diamine is 4,4'-oxydianiline.

13. The process of claim 7, further comprising curing the phosphazene-containing polyhexahydrotriazine elastomer in a reaction with a peroxide.

14. The process of claim 7, further comprising curing the phosphazene-containing polyhexahydrotriazine elastomer by vulcanization.

15. An article of manufacture comprising a material that includes an elastomer containing a phosphazene backbone and at least one polyhexahydrotriazine component.

16. The article of manufacture of claim 15, further comprising at least one electronic component.

17. The article of manufacture of claim 16, wherein the at least one electronic component is selected from a group consisting of printed circuit boards, semiconductors, transistors, optoelectronics, capacitors, resistors, and chip carriers.

18. The article of manufacture of claim 15, wherein the material is an adhesive.

19. The article of manufacture of claim 15, wherein the material is a synthetic rubber.

20. The article of manufacture of claim 15, wherein the elastomer includes at least one ether-linked side chain.

* * * * *